(Model.)

W. G. STEWART.
BEEHIVE.

No. 489,696. Patented Jan. 10, 1893.

Witnesses

Harry L. Amer

N. J. Riley

By his Attorneys,

C. A. Snow & Co.

Inventor

W. G. Stewart.

UNITED STATES PATENT OFFICE.

WILLIAM G. STEWART, OF IRELAND, INDIANA.

BEEHIVE.

SPECIFICATION forming part of Letters Patent No. 489,696, dated January 10, 1893.

Application filed April 28, 1892. Serial No. 430,986. (Model.)

*To all whom it may concern:*

Be it known that I, WILLIAM G. STEWART, a citizen of the United States, residing at Ireland, in the county of Dubois and State of Indiana, have invented a new and useful Beehive, of which the following is a specification.

The invention relates to improvements in bee hives.

The object of the present invention is to simplify and improve the construction of bee hives, and to facilitate the work of an apiarian, and to enable surplus honey to be conveniently removed.

The invention consists in the construction and novel combination and arrangement of parts hereinafter fully described, illustrated in the accompanying drawings and pointed out in the claim hereto appended.

Figure 1:
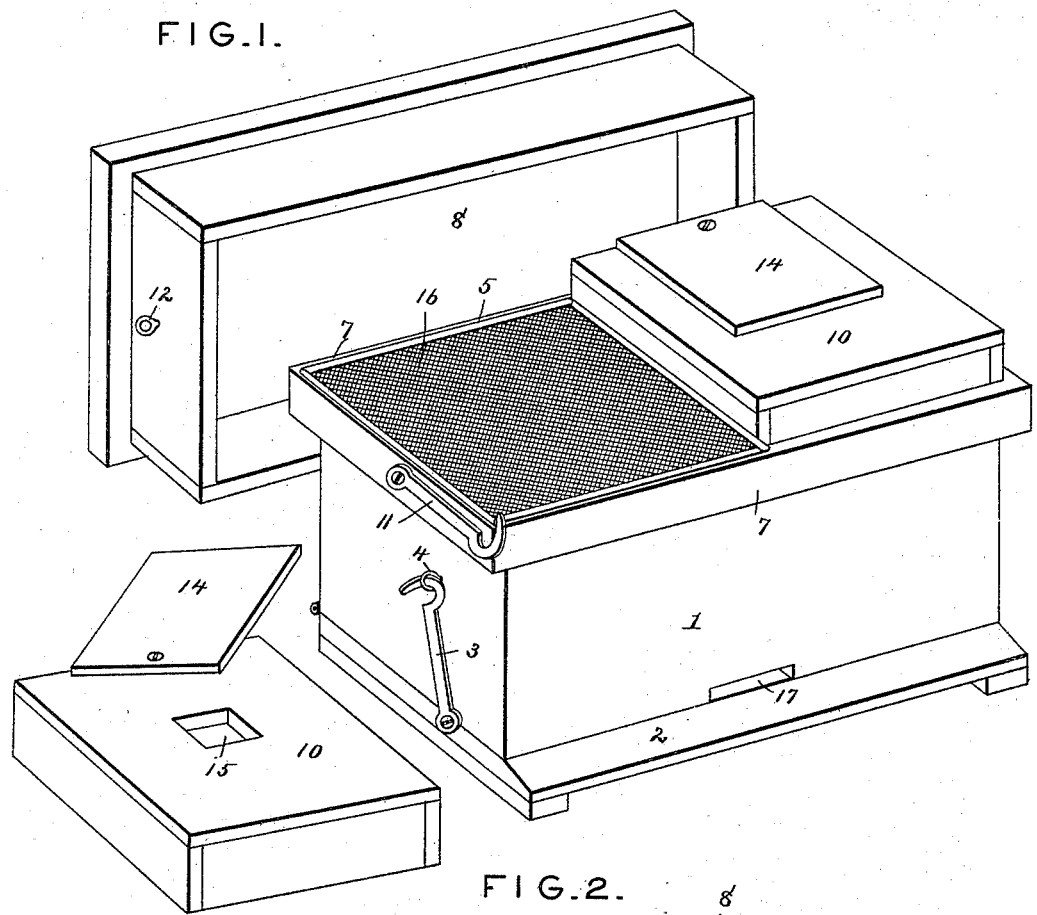
Figure 2:
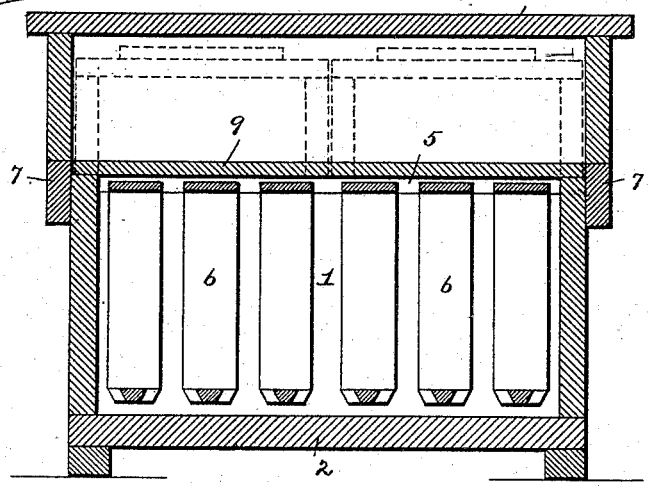

In the drawings—Figure 1 is a perspective view of a bee hive constructed in accordance with this invention, the cover being removed, together with one of the supers, and the screen being in the place in the hive occupied by the removed super. Fig. 2 is a vertical sectional view the supers being removed, but shown in dotted lines, and the weather board being in place.

Like numerals of reference indicate corresponding parts in all the figures of the drawings.

1 designates the body of a bee hive having a hinged bottom 2 retained in proper position by hooks and eyes 3 and 4, and adapted to be swung down to permit the hive to be cleaned. The upper edges of the sides of the body are rabbeted at 5 to form ledges for supporting brood frames 6 and secured to the top of the body on the outside thereof are cleats 7, upon which a cover 8 rests, and which projects slightly above the body and forms a recess to receive a weather board 9, which is employed to protect these in winter from cold, supers 10 being removed when the weather board is in use. The cover 8 is secured in place by hooks and eyes 11 and 12. Each super 10 is provided with a pivoted cover or slide 14, which is adapted to cover an opening 15 through which smoke may enter when it is desired to remove surplus honey from a super. The bees are driven by smoke from the super and the latter is removed from the hive, and while away from the hive the place occupied by the super is covered by a rectangular wire gauze screen 16.

The bottom 2 is extended beyond one side of the hive to form an alighting board, and the bee entrance 17 is provided.

It will be seen that the hive is comparatively inexpensive in construction and is capable of greatly facilitating the work of the apiarian, and is adapted to render the care of bees successful.

What I claim is—

The combination with a hive comprising a body provided on its outer face at the top with the cleats 7 projecting above the upper edges of the body and forming a continuous recess adapted for the reception of a horizontal removable weather board and to permit the latter when used to be flush with the upper edges of the cleats, and a removable cover adapted to rest on the upper edge of the cleats, of the two independently removable supers arranged within the recess of the body and entirely filling the same and each being adapted to be removed to be replaced by the bee confining screen, substantially as described.

In testimony that I claim the foregoing as my own I have hereto affixed my signature in the presence of two witnesses.

WILLIAM G. STEWART.

Witnesses:
    JOHN P. NORMAN,
    WM. S. ROSE.